United States Patent [19]
Hehl

[11] 3,804,576
[45] Apr. 16, 1974

[54] APPARATUS FOR PIVOTING A COMPONENT OR A GROUP OF COMPONENTS OF AN INJECTION MOLD

[76] Inventor: Karl Hehl, Siedlung 183, D-7291 Lossburg, Germany

[22] Filed: June 16, 1972

[21] Appl. No.: 263,470

[30] Foreign Application Priority Data
June 16, 1971 Germany.............................. 2129752
June 28, 1971 Germany.............................. 2132089

[52] U.S. Cl................. 425/451, 425/246, 425/130
[51] Int. Cl............................. B29f 1/00, B29f 1/12
[58] Field of Search.......... 425/130, 450, 242, 246, 425/438, 451; 74/57, 127, 128, 129

[56] References Cited
UNITED STATES PATENTS
3,702,750  11/1972  Veneria .............................. 425/130
3,091,810  6/1963  Turner.................................... 425/3
3,435,483  4/1969  Heiner et al........................ 425/130
3,719,446  3/1973  Cleevely ......................... 425/438 X

FOREIGN PATENTS OR APPLICATIONS
1,267,831  5/1968  Germany ........................... 425/134

*Primary Examiner*—J. Spencer Overholser
*Assistant Examiner*—David S. Safran
*Attorney, Agent, or Firm*—Spencer & Kaye

[57] ABSTRACT

Apparatus for pivoting a component or a group of components of an injection molding machine about a sector angle not greater than 180°. The apparatus includes a drive shaft mounted with its longitudinal axis coincident with the horizontal axis of symmetry of the mold closing unit. The drive shaft includes two drive grooves formed in its outer surface. A control pin is mounted for engaging the drive grooves for effecting a pivotal movement of the component. The drive shaft is connected to, and serves as a pivot axis for, the component to be pivoted.

14 Claims, 13 Drawing Figures

APPARATUS FOR PIVOTING A COMPONENT OR A GROUP OF COMPONENTS OF AN INJECTION MOLD

BACKGROUND OF THE INVENTION

The present invention relates to an apparatus for pivoting a component or a group of components of an injection mold about a sector angle not greater than 180° or less with the aid of a drive shaft whose outer surface contains at least one helical drive groove in which a control pin is engaged to produce the pivotal movement. The pivot axis of the component or group of components is coincident with the horizontal axis of symmetry of the mold closing unit, and the driving energy for the pivotal movement is derived from the opening or closing stroke of the mold.

In a known apparatus of the type under consideration, a drive shaft is fastened to the movable clamping plate of the mold about an axis which is external to the horizontal axis of symmetry. The drive shaft, moreover, is not rotatable. The drive shaft is provided at its outer surface with a helical groove. A control pin is provided for radial engagement with the helical groove. In the course of the axial movement of the drive shaft the control pin effects the rotation of a coupling sleeve which itself is in force-transmitting communication with the mold component to be pivoted. Such an apparatus is disclosed, for example, in German Pat. No. 1,267,831.

SUMMARY OF THE INVENTION

It is an object of the present invention to provide an apparatus of the above-mentioned type which has a high degree of functional dependability and is of simpler construction.

It is another object of the present invention to provide an apparatus of the above-mentioned type in which the drive shaft serves as a pivot shaft and is directly connected with the component or components to be pivoted.

These and other objects are accomplished according to the present invention by the provision of a drive shaft which is mounted so that its longitudinal axis is coincident with the horizontal axis of symmetry of the mold unit. The drive shaft is provided with two drive grooves and serves as a pivot shaft for, and is directly connected with, the component or components to be pivoted, or rotated.

Advisably the two drive grooves each extend only over one half of the circumference of the drive shaft with the two terminal portions of each groove enclosing a sector angle of 180°.

The two drive grooves are formed in the outer surface of the drive shaft in such a manner that each base point of a drive groove lies diametrically opposite the corresponding base point of the other drive groove, with diametrically oppositely disposed base points being disposed equidistantly with respect to one another.

In a preferred embodiment, both drive grooves terminate in diametrically oppositely disposed linear end sections, with the end sections on the same side of the shaft being in communication with one another via a linear idling groove section. The base surface of the idling groove is inclined with respect to the horizontal symmetrical axis of the mold unit and extends radially outwardly in a direction toward the stationary clamping plate of the mold unit.

DESCRIPTION OF THE PREFERRED EMBODIMENTS

In the embodiment of FIGS. 1-6, the injection mold, which serves to produce multi-component or multi-colored objects, includes a movable mold half 19 which is fastened to a movable mold clamping plate 38, a stationary mold half 1 fastened to a stationary clamping plate 37, and a component disposed between the two mold halves 19 and 1. The component is constructed as a transporting plate 9.

Figure 1:
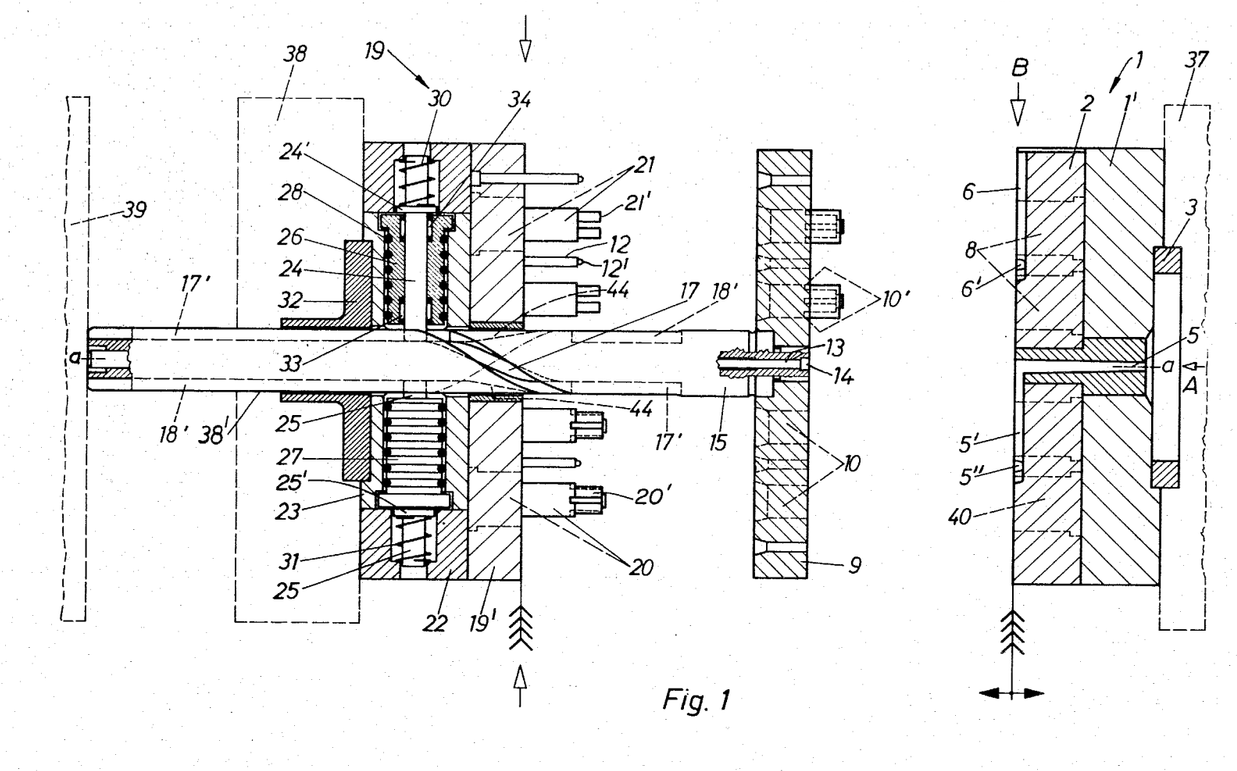
FIG. 1 is a longitudinal sectional view of an injection mold according to the present invention shown in an open position.

The mold half 19 which includes a profile plate 19' within which mold cores 20, 21' and 21, 21' are releasably fastened and exchangeably connected. The mold half 1 includes a cavity plate 2 within which interchangeable cavity inserts 8 and 40 are provided. Each core has a cylindrical base portion which is releasably fastened in the profile plate 19' and an outer portion extending from the base portion and outwardly from the profile plate 19' to an extent which corresponds to the thickness of the transporting plate 9. The cores 20, 20' form within the cavities in inserts 40, mold cavities which correspond to the shape of one color or material component, hereinafter referred to as the half object, while the cores 21, 21' form within the cavities in inserts 8, mold cavities which correspond to the shape of the whole object. The transporting plate 9 is movable in the opening direction of the mold relative to the stationary mold half 1 and to the movable mold half 19. The transporting plate 9 is mounted on the free end of a shaft 15 which serves as a drive shaft. The drive shaft 15 extends rearwardly through a central bore 38' of the movable clamping plate 38. When the mold is closed the end of the shaft 15 is disposed at a distance from a stationary abutment 39 which corresponds to approximately one-half of the opening path of the movable mold half 19.

A guide and centering collar 32 serves to center the movable mold half 19 at the movable clamping plate 38 and at the same time serves as an axial guide and support bearing for the drive shaft 15.

The transporting plate 9 is axially displaceable along the horizontal axis of symmetry a—a of the injection mold unit. The transporting plate 9 is provided with bores 10. These bores are disposed coaxially to cores 20, 20' and 21, 21' when the mold is either completely closed or completely open. The inner diameter of the bores 10 is equal to or greater than the maximum diameter of the cores 20, 20' and 21, 21'.

The cores 20, 20' and 21, 21' are symmetrically disposed on the profile plate 19' to opposite sides of the horizontal axis of symmetry a-a. The cavity inserts 8 and 40 are similarly symmetrically disposed in the cavity plate 2 to opposite sides of the axis a—a. The relative movement in the opening direction between the movable mold half 19 and the transporting plate 9 is controlled in such a way that the transporting plate 9 comes to lie on the side of the actual cores 20', 21' facing the movable clamping plate 38 when the mold is closed, and it comes to lie on the other side of these cores when the mold is completely open.

Figure 2:
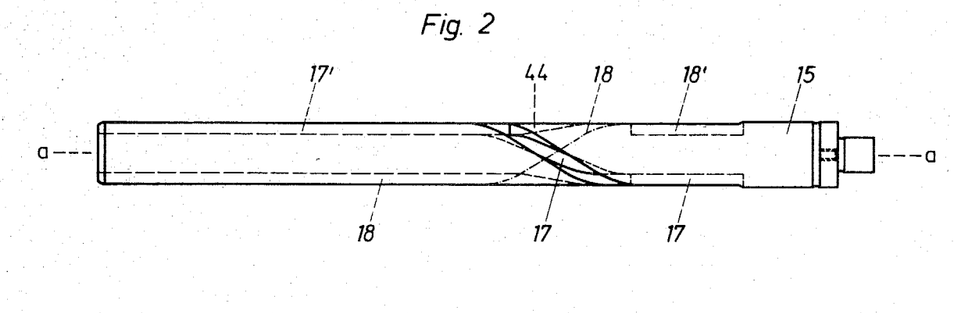
FIG. 2 is a longitudinal view of the drive shaft shown in assembly in FIG. 1.
Figure 3:
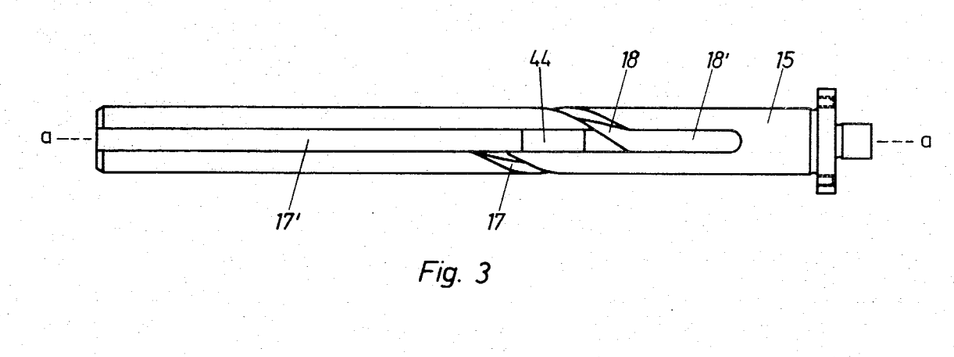
FIG. 3 shows the drive shaft of FIG. 2 pivoted by 90° about its axis.

The pivoting of the rotating drive shaft 15 for the transporting plate 9 is effected at the proper time by means of two diametrically oppositely disposed helical drive grooves 17 and 18 which are formed in the outer surface of the drive shaft 15, and by two coaxially disposed control pins 24 and 25 which are axially displaceably mounted in the movable mold half 19 and which engage the grooves 17 and 18, respectively. The drive grooves 17 and 18 each extend only over one-half of the circumference of the drive shaft 15. Both helical grooves 17, 18 terminate on both sides of the shaft 15 in diametrically oppositely disposed axial groove sections 17' and 18', respectively. The groove section 17' of one end of one groove is on the same side as, and aligned with, a groove section 18' of the other end of the other groove. The terminal portions of each drive groove enclose a sector angle of 180°, with each base point of the drive groove 17 being disposed diametrically opposite the corresponding base point of the other drive groove 18. All corresponding base points of both drive grooves 17 and 18 are equidistant with respect to one another. The axial groove sections 17' and 18' at the same side of the shaft are connected together via an idling groove section 44. The base area of the idling groove section 44 is inclined with respect to axis a—a, and extends radially outwardly in the direction toward the stationary clamping plate 37. The coaxially disposed control pins 24 and 25, which are diametrically opposed with respect to the axis of the shaft 15, are rotatably mounted in damping bushings 26 and 27, respectively, by means of roller bearings 33 and 34. The damping bushings 26 and 27 are each disposed in an abutment plate 23. The contact between the bushings 26 and 27 and their respective abutment plate 23 takes place through the intermediary of elastic O-rings 28. The control pins 24 and 25 are each biased toward the shaft 15 by a spring 30 and 31, respectively. The springs 30 and 31 are mounted between annular flanges 24' and 25' of the pins 24 and 25 and an annular shoulder of a cover member 22.

Figure 4:
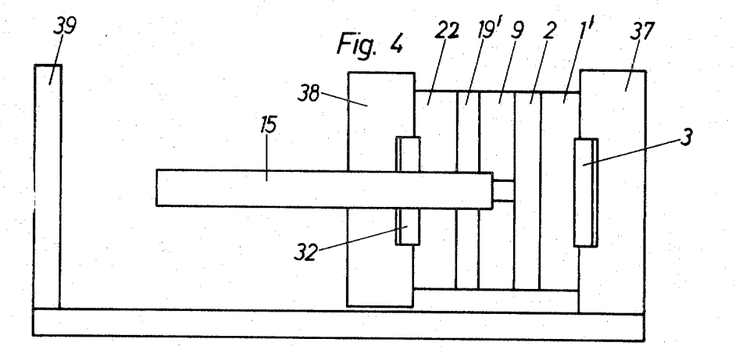
FIGS. 4-6 are schematic representations of the injection mold shown in three stages of movement, namely, in a closed, partly open and opened position, respectively.
Figure 5:
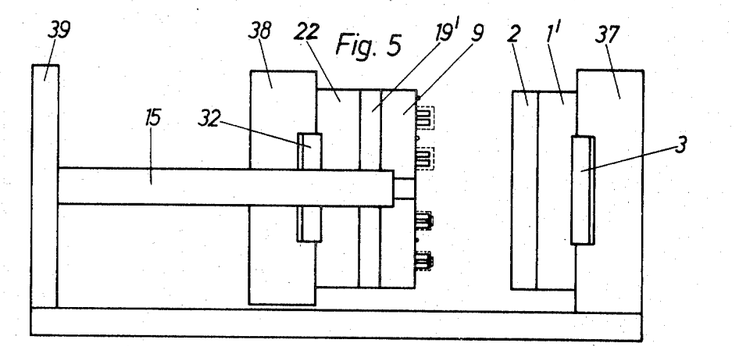

The apparatus according to the embodiment of FIGS. 1–6 operates as follows:

With the mold closed, as shown in FIG. 4, the half objects produced during the preceding molding cycle in the mold cavities for the half objects are now disposed in the mold cavities for the whole objects, while the cavities fo the half objects are empty. The first color component or first material component is now injected into the mold cavities for the half objects. Now the thermoplastic material for the half objects which forms the first color component is delivered in the direction A from an injection device (not shown) through the charging channel 5 and branch channels 5', 5" and pressed into the mold cavities for the half objects. At the same time the second color component or the second material component for forming the whole objects is injected into the mold cavities for the whole objects in which the half objects are already disposed. The injection occurs through the charging channel 6 and branch channel 6' and in the direction B. Thereafter the mold is opened in the usual manner. The movable clamping plate 38 together with the mold half 19 fastened thereto and the transporting plate 9 are displaced along the axis a—a away from the stationary mold half 1. The first stage of the opening stroke is shown in FIG. 5. As can be seen the free end of drive shaft 15 has reached the abutment 39. The charges formed in the charging channels 6, 6' and 5, 5', 5" are drawn out of their forming channels in the course of this first stage of the opening stroke of the mold and are supported by their anchoring members 14 and 12', respectively. Member 14 is a cavity associated with a pin 13 extending axially through shaft 15. Members 12' are carried by pins 12. At least the charges in channels 5" are severed from the molded half objects in cavity inserts 40 by suitable cutting elements which may form part of inserts 40.

Figure 6:
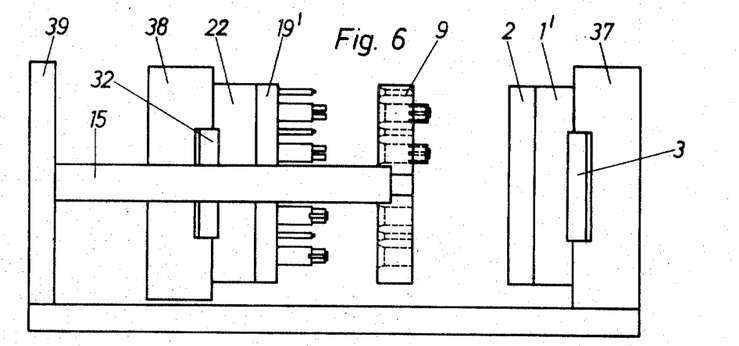

In the course of the further opening stroke of the mold in which the mold is completely opened as shown in FIG. 6, the movable clamping plate 38 together with the mold half 19 are moved further to the left by a distance which is approximately equal to the distance of the movement during the first stage. Since the transporting plate 9 is mounted to the shaft 15 so that it moves therewith, and since the drive shaft 15 abuts the abutment 39 thereby preventing any further axial movement of the shaft 15, there results a relative movement between the movable mold half 19 and the drive shaft 15. In the course of this relative movement the linearly moved control pins 24 and 25 first slide in the linear groove sections 18' and 17' and then in the helical groove sections of the drive grooves 18 and 17. During the linear sliding of the stationary control pins in the helical groove sections 18 and 17 there results a pivoting movement of the transporting plate 9 by 180°.

At the beginning of the relative movement between the drive shaft 15 and the movable mold half 19 the transporting plate 9 is separated from the profile plate 19'. Thus the finished whole objects are pushed away from the cores 21, 21' so that they fall out of the mold. At the same time the half objects are stripped from the cores 20' by the transporting plate 9, anchoring members 12' withdraw with plate 19' from plate 9, and anchoring member 14 is cleared by the movement there-into of pin 13 under the action of abutment 39. These half objects adhere in the area of the surfaces 10' in transporting plate 9. Surfaces 10 are formed to define an anchoring region of greater diameter than the remainder of groove 10. After pivoting of the transporting plate 9 by 180°, the half objects come to lie coaxially to cores 21', as can be seen in FIG. 1. When the mold is closed, the control pins 24 and 25 slide over the linear idling groove sections 44. As a result, a rotation of the shaft 15 does not occur during the closing stroke of the mold. Without a further rotation of the shaft 15 the transporting plate 9 does not pivot. Thus the cores 21, 21' again enter into the coaxial bores 10 of the transporting plate 9 and the cup-shaped half objects are slipped over the cores 21' are held thereby, for example. In the course of the further closing stroke of the mold the transporting plate 9, which is now in contact with profile plate 19', abuts against the cavity plate 2 with its cavity inserts 8 and 40. When the mold is closed, the mold cavities for the whole objects and the mold cavities for the half objects are thus newly formed, with the previously formed half objects being disposed in the mold cavities for the whole objects and the mold cavities for the half objects are empty, that is, ready to receive a subsequent injection of the first color or material component.

Thus the pivotal movement of the transporting plate 9 through an angle of 180° with the aid of the apparatus of the present invention during each opening stroke of the mold unit, causes the half objects to be transferred from their mold cavities into the mold cavities for the whole objects where they are further processed into whole objects.

Figure 7:
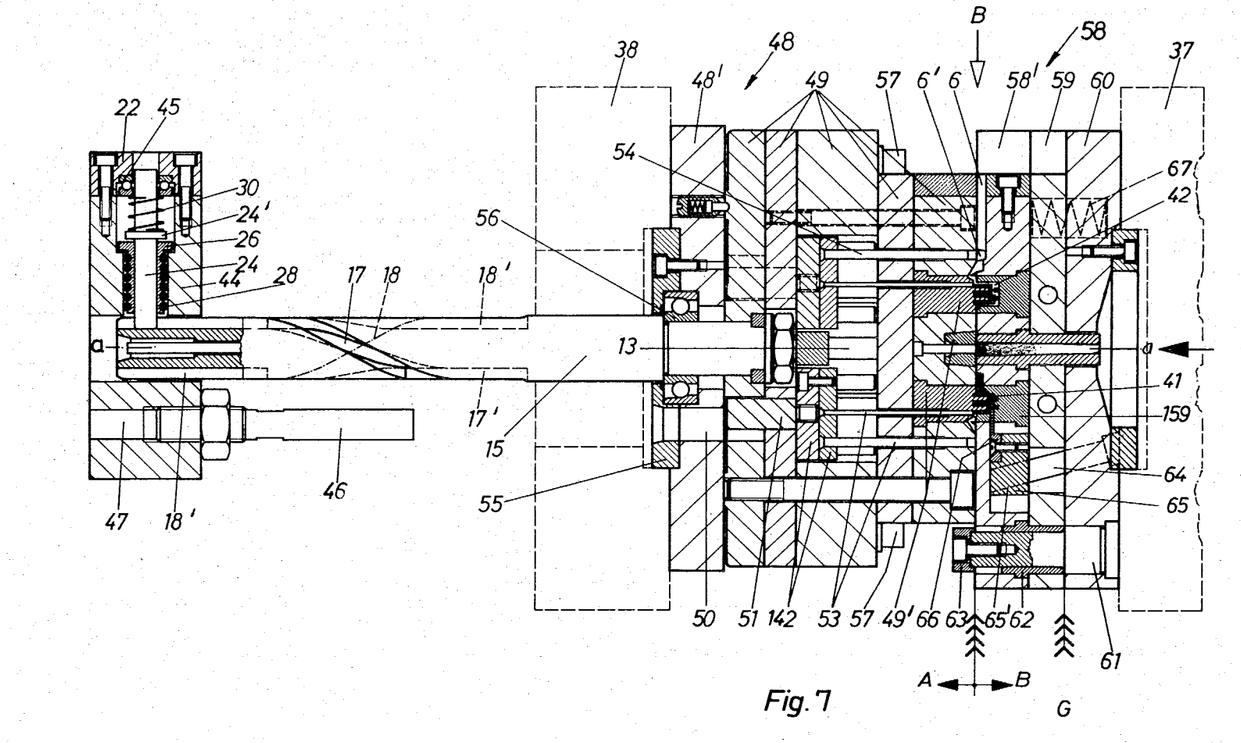
FIG. 7 is a longitudinal sectional view taken along the line 7—7 of FIGS. 9 and 10 showing a variation of the apparatus according to the present invention with the mold shown in a closed position.
Figure 8:
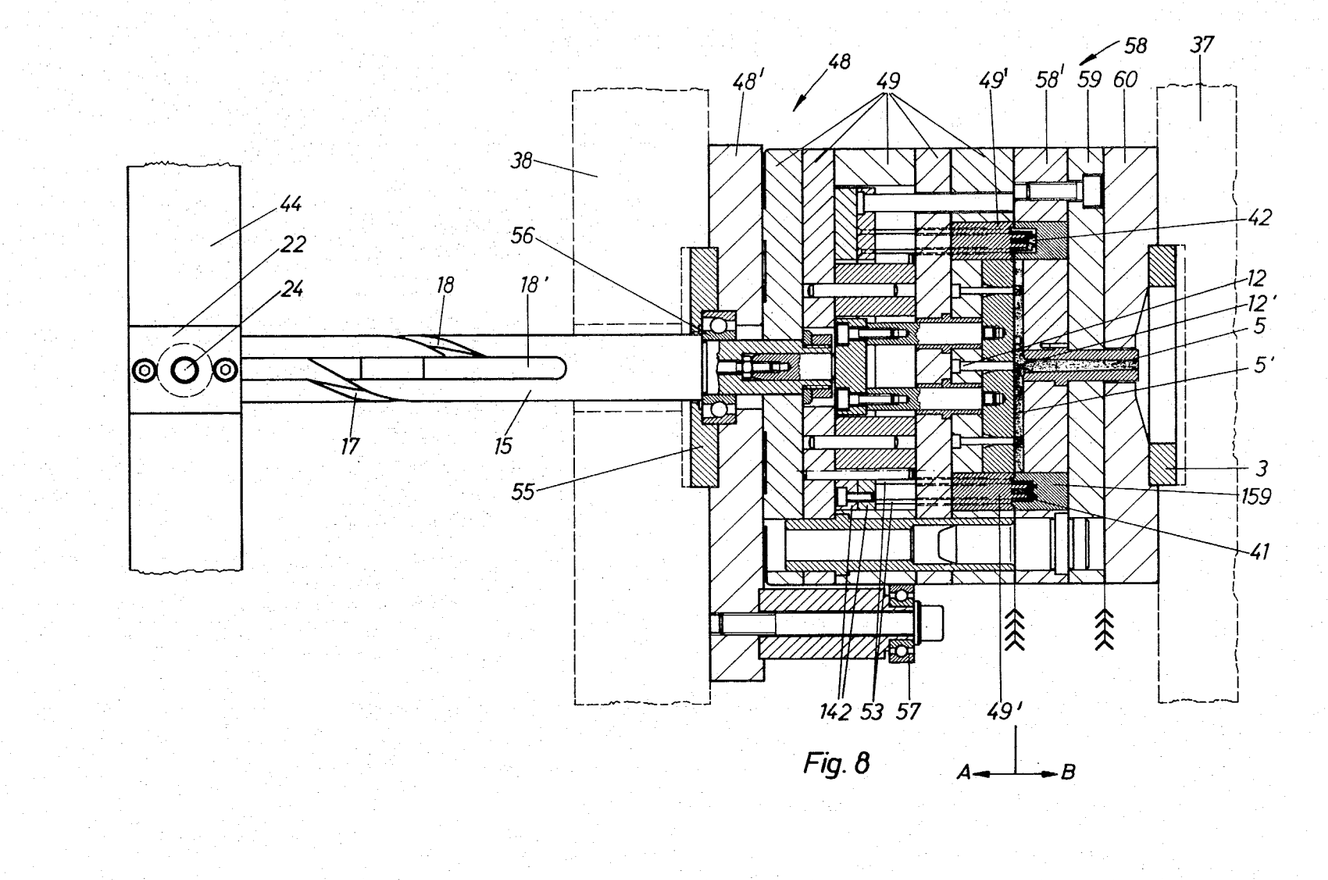
FIG. 8 is a longitudinal sectional view taken along the line 8—8 in FIGS. 9 and 10 showing the apparatus of FIG. 7 pivoted by 90°.
Figure 9:
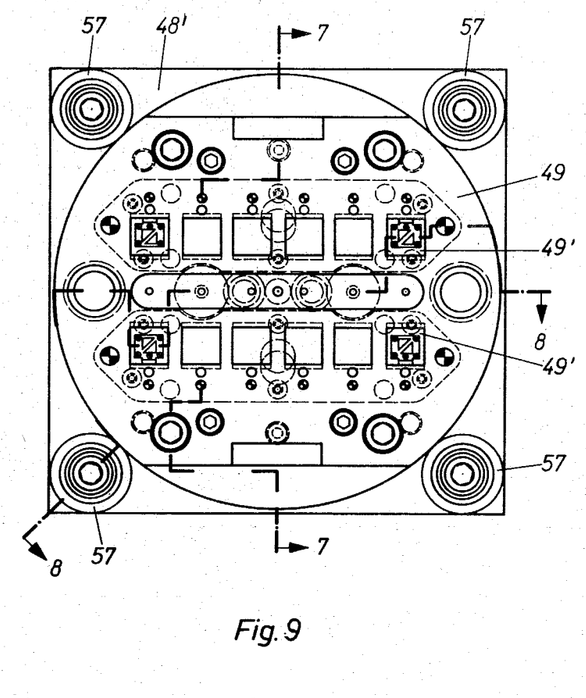
FIG. 9 is a plan view taken in the direction of arrow A of FIGS. 7 and 8 showing the group of components to be pivoted.
Figure 10:
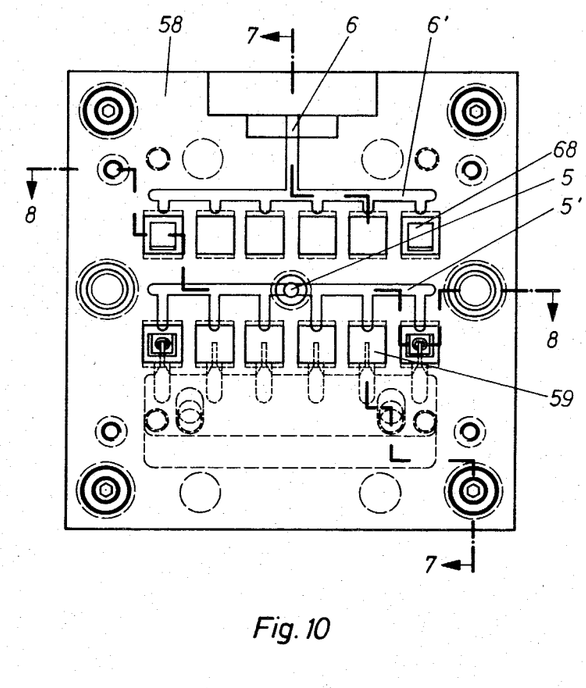
FIG. 10 is a plan view in the direction of arrow B of FIGS. 7 and 8 showing the stationary mold half of the mold unit.
Figure 11:
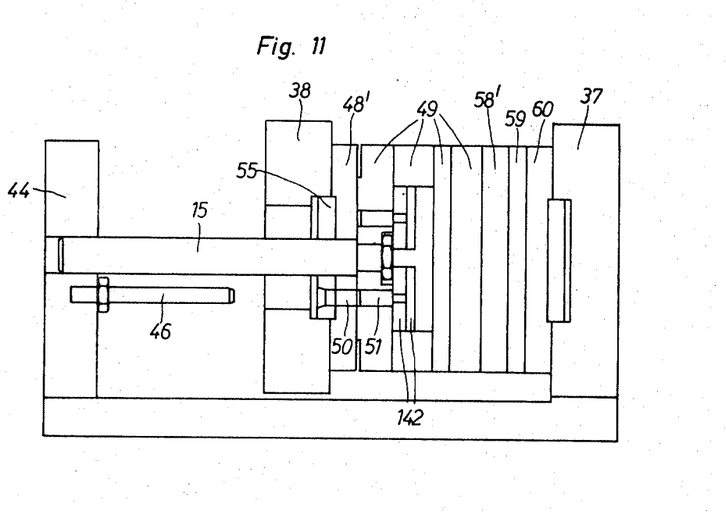
FIGS. 11 and 12 are schematic representations of the injection mold according to FIGS. 7-10 during two stages of movement, namely, in the closed and opened positions, respectively.
Figure 12:
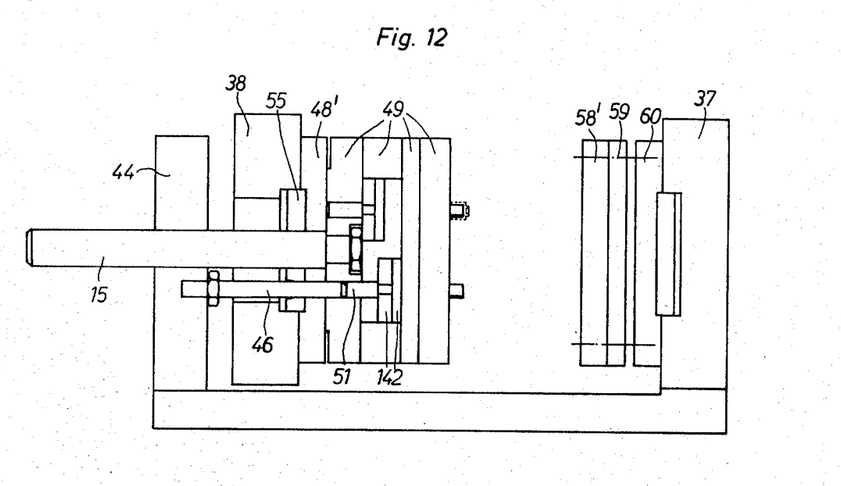

In the illustrated embodiment according to FIGS. 1–6, the pivotal movement of the pivotal component, in this case the transporting plate 9, is produced as a result of the control pins 24 and 25 engaging the helical grooves 17 and 18 together with the movement of the movable mold half 19 in a linear direction to the axially stationary drive shaft 15. In the embodiment according to FIGS. 7–12 the pivoting of a component group 49 is effected at an appropriate time as a result of the drive shaft 15 axially moving toward the left, when viewing FIGS. 7 and 8, together with the movable mold clamping plate 38 and mold half 48, while a control pin 24, which engages in a drive groove 17 or 18, respectively, remains stationary. The control pin 24 is axially displaceably mounted in a stationary receptacle 44. The control pin 24 is mounted in the same manner as in the above-described embodiment of FIGS. 1–6, that is, in a damping bushing 26 with the aid of roller bearings. The damping bushing 26 is mounted in the receptacle 44 through the intermediary of the elastic O-rings 28. A spring 30, which biases the control pin 24 toward the shaft 15 and rotates therewith, abuts at one end of a collar 24' of the control pin 24 and at the other end of a pressure bearing 45, which itself is in a cover 22 connected with the receptacle 44. Within a bore 47 of the stationary receptacle 44 an ejector 46 is anchored. A bearing plate 48' of the movable mold half 48 contacts the movable mold clamping plate 38. The component group 49, which is to be pivoted by the apparatus of the present invention through an angle of 180°, is part of the movable mold half assembly 48. The component group 49 includes at its front end a profile plate from which cores 49' extend. The above-mentioned component group is permanently connected with the drive shaft 15 and pivotally mounted to the bearing plate 48'. As can be seen in FIGS. 7, 8 and 9, the pivotal component group 49 and the cores 49' are supported by support bearings 57 which are anchored in the bearing plate 48'. The drive rod 15 is mounted in a bearing 56 which itself is mounted partly in a centering ring 55 and partially in the bearing plate 48'.

A cavity plate 58' of a stationary mold half 58 is mounted via the supporting plate 59 and the fastening plate 60 to the stationary clamping plate 37. The cavity plate 58' is provided with cavity inserts 159.

The movable mold half 48 is closed off at its front end by the profile plate which together with its cores 49' and the cavity inserts 159 of the cavity plate 58', form mold cavities 41 for the half objects and mold cavities 42 for the whole objects.

The bearing plate 48' is provided with a bore 50 through which the ejector 46 passes when the mold opens. Upon opening of the mold, the ejection stroke of the ejector 46 is transmitted via an abutment element 51 and an ejector plate 142 to ejector pins 53 for ejecting the whole objects, which at the moment of actuation of the ejector pins are disposed in the axial path of movement, and ejector pin 54 which serves to eject the charge 6, 6', which was produced during formation of the whole objects. The group of components 49 are rotated through an angle of 180° before the ejector 46 is received within the bore 50 for ejecting the whole objects.

In the embodiment of the present invention illustrated in FIGS. 7–12, the stationary mold half 58 is actually rendered capable of a limited range of movement to define thereby a parting line G. The supporting plate 59 and the fastening plate 60 can be mutually displaced with respect to one another by the force of springs 67. A pin 64 of the fastening plate 60 which is inclined with respect to the horizontal axis of symmetry a—a engages in the oblique bore 65' of a core mover 65. The core mover 65 is movable in a radial direction to the axis a—a.

The mold parting line G and the limited movement of the cavity plate 58' and the supporting plate 59 serves exclusively for the radial displacement of a core mover 65 at the onset of the mold opening. The core mover 65 has mounted therein a core 66 and controls a portion of the core 66 which undercuts the half objects and blocks part of cavities 41 to create a charging channel for the subsequent delivery of charge of the second color component in the half objects. The slide surfaces of an oblique bore 65' of the core mover 65 slide along the surface of the inclined pin 64 and thus effect the radial displacement. The radial displacement of the core 66 is a prerequisite for the release of the half objects for the subsequent pivoting movement of the component group 49 by which the half objects are transferred into the cavities 42 for the whole objects.

In its limited movement, when the mold is being opened, the cavity plate 58' and the supporting plate 59 are guided with the aid of guide bolts 61 and guide sleeves 62. An element 63 forms a limiting abutment for the movement under consideration.

The apparatus according to the embodiment of FIGS. 7–12 operates similarly to the embodiment disclosed in FIGS. 1–6, that is, insofar as the pivoting of the component group 49 is concerned.

Figure 13:
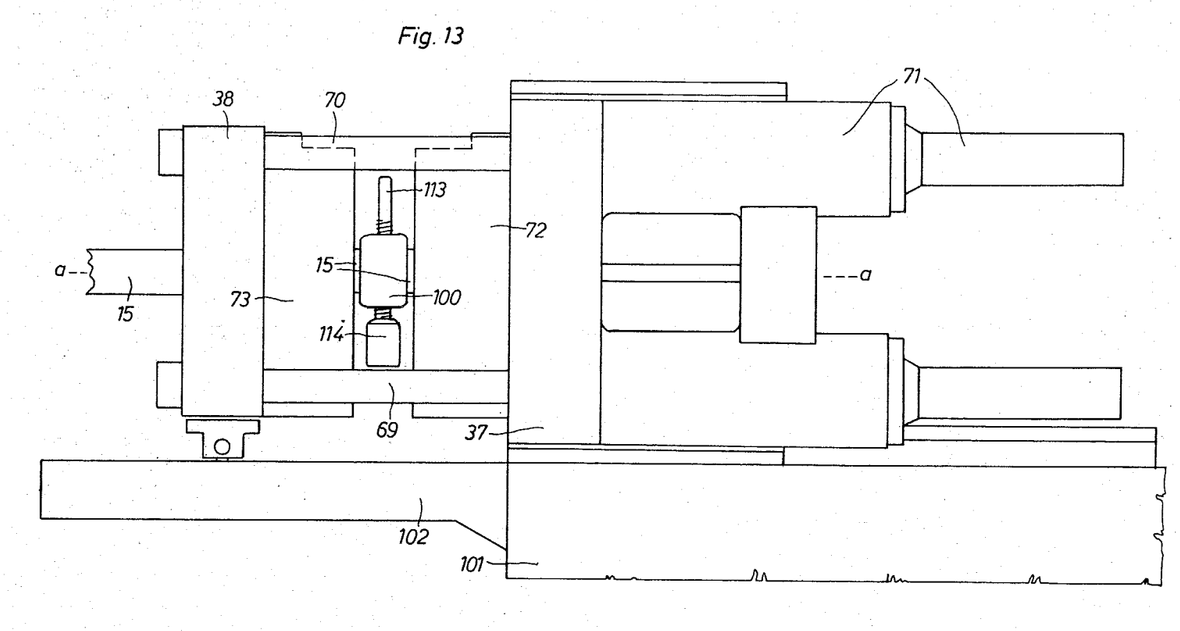
FIG. 13 illustrates a further embodiment of an injection molding unit according to the present invention.

FIG. 13 shows a further example of a use for the apparatus of the present invention, where the apparatus is structurally integrated with a mold suited for the manufacture of bottles from injection molded preshaped objects by an injection blowing process. A mold 72, 73 is held by a mold closing unit 37, 38 and 71 which is seated on a machine base 101. The stationary clamping plate 37 together with the hydraulic cylinders 71 form a structural unit. The hydraulic cylinders 71 serve to produce the necessary pressure for opening and closing the mold. Piston rods 69 and 70 of the pistons which are mounted in the hydraulic cylinders 71, have the clamping plate 38 mounted thereon. The clamping plate 38 is supported with the aid of a supporting arm 102 which extends from the base 101. The drive shaft 15 lies along the horizontal axis of symmetry a—a of the mold closing unit. The object to be pivoted in a core support 100 which holds two rows of diametrically opposed cores. In FIG. 13 one of the preshaped objects 113 which each enclose one of the cores can be seen as well as one of the bottles 114 which each enclose one of the diametrically opposed cores. When the mold is closed, all of the cores lie in their respective cavities. The cavities for forming the preshaped objects as well as the cavities for blowing the bottles are formed by the cavity plates, respectively, of the two mold halves.

The construction and mode of operation of the pivoting device according to FIG. 13 corresponds exactly to the construction and mode of operation of the pivoting device in the embodiment of FIGS. 1–6. The only difference is that in the embodiment of FIG. 13 the core support 100 is pivoted and serves for the production of bottles in an injection blowing process, while in the embodiment of FIGS. 1–6 a transporting plate 9 is to be pivoted through a sector angle of 180° with every opening stroke. The release of the support 100 to be pivoted when the mold is opened also takes place in a manner similar to that shown schematically in FIGS. 4–6. When the mold is closed the preshaped objects 113 are formed in the mold cavities by an injection of thermoplastic material in the usual manner, while in the blow molds the preshaped objects which were formed in the preceding molding cycle and which were then pivoted into the blow mold cavities are now blown to their final bottle shape. Then the mold closing unit opens.

During the opening stroke, the movable clamping plate 38 moves to the left and thereby carries the mold half 73 to the left of the parting line along with the drive shaft 15 and the core support 100 with the preshaped objects 113 and the bottles 114. Thus the preshaped objects 113 and the bottles 114 are lifted away from their right-hand mold cavities. Then the drive shaft 15 abuts against an abutment (not shown) so that a relative movement results between the drive shaft 15 and the movable mold half 73 through the utilization of control pins similar to pins 24 and 25 of the embodiment of FIG. 1. In the course of this further movement, the core support 100 with the preshaped objects 113 is pivoted by 180°. At the end of the pivoting movement and upon renewed closing of the mold, the cores which previously carried the bottles are disposed in the cavities for the preshaped objects 113, and the cores with the preshaped objects 113 are disposed in the cavities where the bottles 114 are formed.

It will be understood that the above description of the present invention is susceptible to various modifications, changes and adaptations, and the same are intended to be comprehended within the meaning and range of equivalents of the appended claims.

I claim:

1. In an apparatus for pivoting at least one component of an injection molding machine about a sector angle not greater than 180° and including a drive shaft provided with at least one helical drive groove formed in its outer surface, a control pin mounted for engagement within the groove for effecting a pivotal movement of the component, the machine including an injection mold unit composed of two clamping members movable relative to one another and arranged to support cooperating mold halves to permit opening and closing movements between such mold halves, with the pivot axis of the component being coincident with the horizontal axis of symmetry of the mold unit, and with the driving energy for the pivotal movement being derived from the opening or closing movements between the mold halves, the improvement wherein: the drive shaft is provided with two drive grooves, is mounted with its longitudinal axis coincident with the horizontal axis of symmetry of the mold closing unit, and is directly connected with, and serves as a pivot axis for, the component to be pivoted; the ends of each said drive groove terminate at diametrically oppositely disposed sides of said shaft in linear groove sections; one of said clamping members is a stationary clamping plate; and each said linear groove section for one said groove is in communication with one said linear groove section for the other said groove via a linear idling groove section, said idling groove section having a base surface which is inclined with respect to the axis of symmetry of the mold unit and extending radially outwardly in the direction toward said stationary clamping plate.

2. An apparatus as defined in claim 1, wherein each of said two drive grooves extend only over one-half of the circumference of the drive shaft, and wherein the terminal ends of each said drive groove enclose a sector angle of 180°.

3. An apparatus as defined in claim 1, wherein each of said two drive grooves is disposed in the outer surface of the drive shaft in such a way that corresponding base points of each drive groove are disposed diametrically opposite one another with respect to the shaft axis, and wherein the distances between corresponding base points of each groove are equal.

4. An apparatus as defined in claim 1, further comprising means for biasing said control pin toward the drive shaft.

5. An apparatus as defined in claim 1, wherein two diametrically oppositely disposed control pins are provided, each engaging one of said drive grooves.

6. An apparatus as defined in claim 1, further comprising a stationary abutment member, wherein the other of said clamping members is a movable mold clamping plate, and wherein said abutment member is disposed at a distance from said movable clamping plate in the path of movement of the drive shaft.

7. In an apparatus for pivoting at least one component of an injection molding machine about a sector angle not greater than 180° and including a drive shaft provided with at least one helical drive groove formed in its outer surface, a control pin mounted for engagement with the groove for effecting a pivotal movement of the component, the machine including an injection mold unit composed of two clamping members movable relative to one another and arranged to support cooperating mold halves to permit opening and closing movements between such mold halves, with the pivot axis of the component being coincident with the horizontal axis of symmetry of the mold unit, and with the driving energy for the pivotal movement being derived from the opening or closing movements between the mold halves, the improvement wherein: the drive shaft is provided with two drive grooves, is mounted with its longitudinal axis coincident with the horizontal axis of symmetry of the mold closing unit, and is directly connected with, and serves as a pivot axis for, the component to be pivoted; and said apparatus comprises a stationary mold half constituting one of such cooperating mold halves, said stationary mold half comprising two units separated by a parting line and displaceable with respect to each other, one of said units includes a core mover within which a bore is situated such that its longitudinal axis is inclined with respect to the horizontal axis of symmetry of the mold closing unit, the other of said units includes a control pin which extends into said bore, both said units being adapted to receive therebetween spring means for effecting the displacement of said units, said core mover being movable in a radial direction to the horizontal axis of symmetry of the mold unit as a result of the engagement of said pin and bore.

8. Apparatus as defined in claim 7, for forming objects in two stages, wherein said core mover includes a core which forms a charging channel for the objects formed in the first of the two stages.

9. An apparatus as defined in claim 1, further comprising bushing means and associated bearing means, and wherein the control pin is rotatably mounted in said bushing means by said bearing means.

10. An apparatus as defined in claim 9, further comprising a movable mold half constituting the other of such cooperating mold halves, and a plurality of elastic ring means, wherein said bushing means is mounted in said movable mold half, and said plurality of elastic ring means are mounted between said bushing means and said movable mold half.

11. An apparatus as defined in claim 10, wherein the component to be pivoted is relatively movable in an axial direction with respect to said movable mold half.

12. In an apparatus for pivoting at least one component of an injection molding machine about a sector angle not greater than 180° and including a drive shaft provided with at least one helical drive groove formed in its outer surface, a control pin mounted for engagement with the groove for effecting a pivotal movement of the component, the machine including an injection mold unit composed of a stationary mold half, a stationary receptacle, and a movable mold clamping plate arranged to support a movable mold half to permit opening and closing movements between the mold halves, with the pivot axis of the component being coincident with the horizontal axis of symmetry of the mold unit, and with the driving energy for the pivotal movement being derived from the opening or closing movements between the mold halves, the improvement wherein the drive shaft is provided with two drive grooves, is mounted with its longitudinal axis coincident with the horizontal axis of symmetry of the mold closing unit, and is directly connected with, and serves as a pivot axis for, the component to be pivoted, and the control pin is disposed in said stationary receptacle and said receptacle is disposed externally of said movable mold clamping plate and in a direction away from said stationary mold half.

13. An apparatus as defined in claim 12, wherein said stationary receptacle is plate shaped and has a central bore which receives one end of the drive shaft when the mold is closed and through which the drive shaft passes when the mold is opened.

14. An apparatus as defined in claim 12, further comprising an ejector rod, wherein said stationary receptacle supports said ejector rod.

* * * * *